S. Pratt.
Tile Roofing.
Nº 64,566. Patented May 7, 1867.

Witnesses.
Theo. Fusche
Wm Travin

Inventor.
Seymour Pratt
Per Munn & Co
Attys.

United States Patent Office.

SEYMOUR PRATT, OF FAYETTEVILLE, NEW YORK.

*Letters Patent No. 64,566, dated May 7, 1867.*

---

IMPROVEMENT IN ROOFING.

---

*The Schedule referred to in these Letters Patent and making part of the same.*

---

TO ALL WHOM IT MAY CONCERN:

Be it known that I, SEYMOUR PRATT, of Fayetteville, in the county of Onondaga, and State of New York, have invented a new and improved Roofing; and I do hereby declare that the following is a full, clear, and exact description thereof, which will enable others skilled in the art to make and use the same, reference being had to the accompanying drawings, forming part of this specification.

This invention consists in constructing a roofing of hydraulic cement mixed with lime and sand, this composition being pressed into square or other proper-shaped blocks or tiles, and laid, when in a set or dried state, upon boards or lath nailed to the rafters. The cement blocks or tiles are, when laid upon the boards or laths, cemented together by and laid upon the same material in a plastic state as the blocks or tiles are made of. In the accompanying sheet of drawings—

Figure 1:
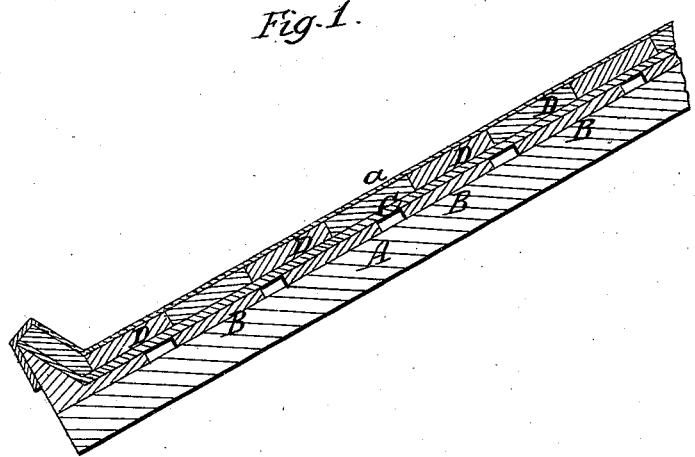

Figure 1 is a section of a portion of a roof constructed or formed according to my invention.

Figure 2:
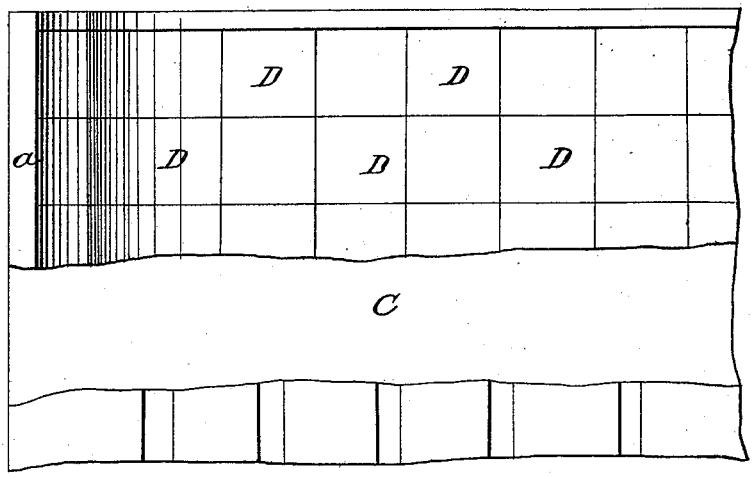

Figure 2, a plan or top view of the same.

Similar letters of reference indicate like parts.

A represents one of the rafters of a roof, and B represents boards attached thereto by nails. In lieu of boards laths may be used, and the lath I consider preferable, as, being narrow and thin, they would not be so liable to affect the cement of the roofing by shrinkage. The boards or laths B are covered with a layer of cement, C, laid on in a plastic state, the cement being mixed with lime and sand in about the same proportion as masons mix cement for cisterns and masonry generally, to wit, one-fourth ($\frac{1}{4}$) part hydraulic cement and three-fourths ($\frac{3}{4}$) of lime and sand. On this cement bed C tiles D are laid, which may be about a foot square and an inch thick. I do not, however, confine myself to these proportions. These tiles D are constructed of hydraulic cement and lime and sand about in the proportions above specified, and they are pressed and moulded like bricks, and are allowed to become perfectly dry and hard before being used. The edges of these tiles when laid are joined by the fresh or soft cement the same as C. By this means I obtain a cheap and durable roof. Hydraulic cement and lime and sand mixed in about the proportions specified, and allowed to set or dry gradually, forms a very hard material like stone. A roofing laid wholly with cement in a plastic state would not answer a good purpose, as it would dry too rapidly under the influence of the sun and wind, and when thus dried cannot be like powder, having but little tenacity. The plastic bed C, however, being covered by the tiles D, is prevented from drying rapidly, and consequently will "set" slowly with the tiles embedded in it, the whole eventually forming a very hard and durable mass. The layer of tiles at the sides of the roof may be kept in place by metal strips $a$, or wooden cleats may be used instead.

Having thus described my invention, I claim as new, and desire to secure by Letters Patent—

A roofing composed of the tiles D, constructed as described, placed on a bed of cement, C, laid on the boards or laths B, substantially as herein shown and described.

The above specification of my invention signed by me this 16th day of January, 1867.

SEYMOUR PRATT.

Witnesses:
WM. F. McNAMARA,
ALEX. F. ROBERTS.